United States Patent
Carlson et al.

[11] 3,898,162
[45] Aug. 5, 1975

[54] SEPTIC TANKS

[75] Inventors: Andrew L. Carlson; John R. Pinezich, both of Northport, N.Y.

[73] Assignee: Andrew Carlson & Sons, Inc., Kings Park, N.Y.

[22] Filed: Aug. 9, 1974

[21] Appl. No.: 496,117

Related U.S. Application Data

[63] Continuation of Ser. No. 389,871, Aug. 20, 1973, abandoned.

[52] U.S. Cl. .............. 210/170; 210/261; 210/532 S
[51] Int. Cl. ................................................ C02c 1/14
[58] Field of Search ...................... 52/19–21, 704; 210/16, 170, 207, 256, 261, 342, 521, 532 R, 533, 532 S, 181

[56] References Cited
UNITED STATES PATENTS

| | | | |
|---|---|---|---|
| 2,670,007 | 2/1954 | Adams | 52/704 X |
| 2,796,176 | 6/1957 | Monson | 210/261 |
| 3,057,796 | 10/1962 | Davis | 210/207 |
| 3,097,166 | 7/1963 | Monson | 210/170 |
| 3,109,813 | 11/1963 | Bergsten et al. | 210/532 S |
| 3,221,881 | 12/1965 | Weiler et al. | 210/532 S |
| 3,240,343 | 3/1966 | Werner | 210/256 |
| 3,443,351 | 5/1969 | Kumazawa | 52/704 |
| 3,487,015 | 12/1969 | Boester | 210/170 X |
| 3,784,012 | 1/1974 | Carlson | 210/170 |

Primary Examiner—Samih N. Zaharna
Assistant Examiner—Robert H. Spitzer

[57] ABSTRACT

An improved sewage disposal system having a domed septic tank with a relatively large volumetric capacity and a long flow path with reduced turbulence is provided wherein the weight of the sewage being treated serves to maintain the septic tank in the system in sealed condition while still giving access to the interior of the leaching pool when required.

9 Claims, 3 Drawing Figures

PATENTED AUG 5 1975

3,898,162

SEPTIC TANKS

This is a continuation of application Ser. No. 389,871 filed Aug. 20, 1973, now abandoned.

BACKGROUND OF THE INVENTION

Sewage disposal systems are known wherein a leaching pool is provided with a septic tank thereon and a flat pre-cast concrete cover having a central opening for access and inspection. The leaching pool and septic tank have generally been composed of pre-cast concrete of a design which, while reasonably satisfactory, leaves much to be desired with respect to cost, efficiency and installation. Prior septic tanks may occupy a relatively larger area and frequently necessitate two separate excavations. Prior systems thus leave much to be desired.

THE PRESENT INVENTION

This invention relates to a novel and highly improved sewage disposal system for dwellings, industrial buildings and the like, especially useful when the available land for installation of the sewage disposal system is comparatively limited. According to the present invention, the septic tank is made of fiberglas (most usually of assembled pre-formed panels or sections) or other suitable plastic inert resistant material having a relatively large volumetric capacity and a relatively long non-turbulent liquid flow path and wherein the septic tank is provided with an access opening in its bottom having a dished cover therefor normally maintained in sealed, closed condition by the weight of liquid in the tank.

Figure 1:
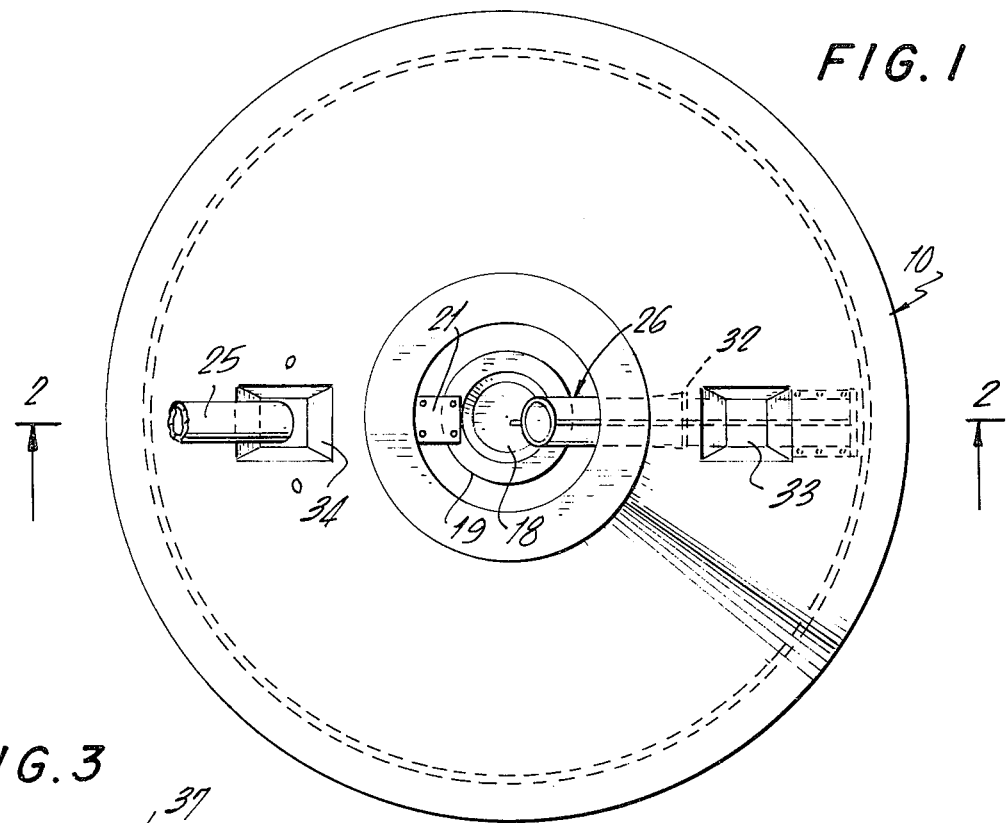
FIG. 1 is a plan view of a sewage disposal system constructed in accordance with this invention but without the dome closure slab.

Referring to the drawing, numeral 10 designates the leaching pool wall of desired height and cross-section (usually circular or rectangular) and which is made up of a plurality of pre-cast concrete drain rings 11 of trapezoidal cross-section thereby providing a plurality of circumferentially disposed and vertically spaced effluent openings 12, it being understood that normally the leaching pool is located in an excavation (not shown) so that it is below ground level. A dome 13 composed of pre-cast concrete or any other suitable material forms an upper closure for the leaching pool 10 and also acts as the side wall and top closure for the fiberglas septic tank 14. The dome 13 is preferably a cone frustrum in shape and is provided with a closure slab 15 of concrete over the upper open end of dome 13 which slab is removable as required to give access to the interior and to the baffle and other inlet and outlet means as hereinafter move fully described.

The septic tank 14 has an annular lateral flange 16 at its upper edge which fits between the uppermost surface of leaching pool 10 and the lowermost surface of dome 13, thereby holding the septic tank securely in position in the upper part of the leaching pool. The bottom of septic tank 14 is provided with a central opening 17 into which fits a dished cover 18 having a peripheral flange 19 larger in diameter than the opening 17 and overlapping the tank material around the openings 17 so that the dished cover 18 cannot pass through opening 17. The flange 19 rests on a neoprene gasket 20 cemented or otherwise secured on the bottom of the tank and at one side of the flange 19 there is provided a polyethylene hinge 21 secured at 22 to the tank bottom and overlapping flange 19 so that when inspection is to take place the dished cover 18 can be swung or pivoted to a position in which the opening 17 is free and gives access to the interior of the leaching pool for inspection, cleaning, etc.

The dome 13 is provided at one side along its interior surface with a fiberglass baffle 23 of generally L-shape leaving an aperture 24 open for the introduction of a "snake" or other instrumentality when slab 15 is removed. Inlet pipe 25 leading from the source of sewage or waste material passes through the dome 13 and has its open inner end in communication with the space formed by baffle 23 and from the directional arrow it will be seen that the sewage received in the dome passes into a generally downward direction more or less parallel to the inner surface of the dome with minimal or greatly reduced turbulence and thereafter follows generally the curvature of the tank 14 as shown by the directional arrows.

At the opposite side of the tank there is a tubular outlet member 26 preferably of fiberglass having a central rib or dividing element 27 thereby forming two channels 28 and 29 for the passage of sewage. Channel 29 is provided adjacent the tank with an inlet opening 30 and the channel 28 is provided with an outlet opening 31 so that when the sewage follows the curvature of the tank 14, enters channel 29 via opening 30 and passes upwardly and then over dividing member 27 and down channel 28 exiting via opening 31 adjacent the upper edge of the leaching pool, thereby making it possible to use the entire height of the leaching pool and all effluent openings therein. Outlet member 26 having end plate 14' is secured to tank 14 and an opening is made at 31.

It will be observed that the innermost end of tubular outlet 26 is provided with a side closure plug 32 held in position by the ribs or members shown and being removed when and if the capacity of the system is insufficient so that another (adjacent) overflow tank or system can be connected in the space occupied by the plug. The adjacent portion of the dome 13 is provided with a recess 33 through which the connection can be made by breaking through the reduced thickness of dome material.

Figure 3:
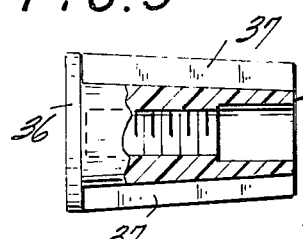
FIG. 3 is a detail view partly in elevation and partly in section of a plastic insert for the inlet baffle.

In FIG. 3 the tapered plastic insert 35 for the inlet baffle 23, which is shown in phantom in dome recess 34 and which passes through a tapered hole in the dome adjacent the recess, serves to secure or hold the baffle in place with the capscrew 36. Because the plastic insert has ribs 37, undesired rotation is prevented. The tapered hole in the recess 34 of the precast concrete dome wall receives the tapered insert and the capscrew inserted from the other side of the wall. Plastic insert 35 thus forms a novel and advantageous means for connecting the baffle and the concrete dome.

Figure 2:
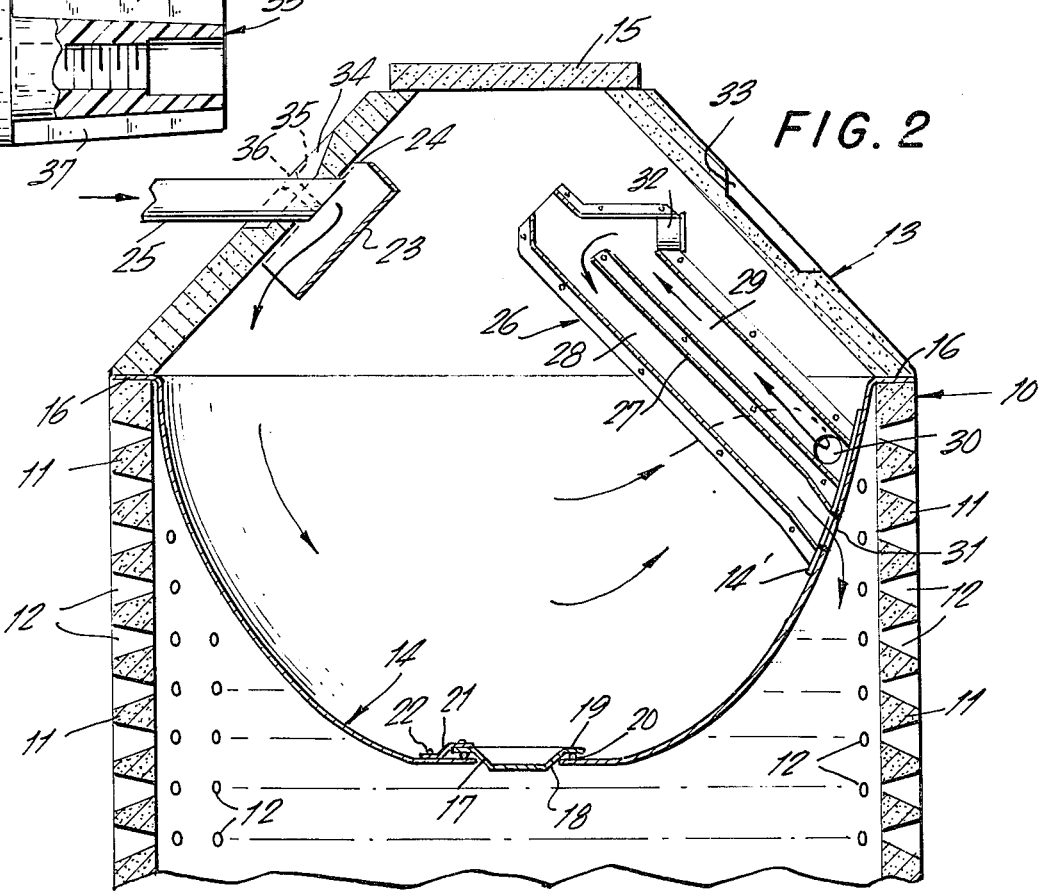
FIG. 2 is a vertical sectional view taken on line 2—2 of FIG. 1.

It will be understood that sewage or other waste material passing through pipe 25 into the space formed by baffle 23 is given a flow direction illustrated by the arrows of FIG. 2 so that after generally following the curvature of the tank 41 the waste material passes through opening 30 up through channel 29, over the end of member 27 and down channel 28 and out through opening 31 into the upper portion of the leaching pool. Thus an unusually efficient and economical arrangement is provided for a given space or volumetric capacity while requiring only a single excavation taking up minimum space. It is to be understood that certain variations and modifications may be made in the details referred to above without departing from the principles of the invention. For example, the gasket 20 and hinge 21 may be composed of neoprene or synthetic rubber or any other suitable or known gasket material which is commerically available and generally called herein rubber-like.

What is claimed is:

1. In a sewage disposal system having a fiberglass septic tank disposed in the upper portion of a leaching pool and a concrete dome forming a side wall and top for said tank, a baffle disposed along one side of the inner surface of the concrete wall for receiving influent from an inlet pipe leading from a source of sewage and for directing said influent down along the wall surface into the tank and means mounted in said wall to secure the baffle in position, said means comprising a tapered plastic insert fitted in a tapered hole in a recess in the dome wall and a capscrew for holding the insert in place.

2. A sewage disposal system according to claim 1, wherein the plastic insert in provided with longitudinal radial ribs to prevent undesired rotation.

3. A sewage disposal system comprising a leaching pool having a wall with effluent slots, a frusto-conical dome atop said wall and forming the top and sides of a concavo-convex bowl-shaped septic tank disposed below the level of the top of the leaching pool wall and having a peripheral flange disposed between and held by the leaching pool wall top and the dome for supporting said septic tank in the upper part of the leaching pool with its side wall curved inwardly from the pool space said septic tank extending only part way down into the leaching pool and being provided with an inspection opening in its bottom for giving access to the interior of the leaching pool and a dished covered displaceably fitting into said opening and having a flange larger than the opening resting on a gasket secured around the opening, said inspection opening being held closed and sealed by the weight of sewage in the tank and a baffled inlet in one side of said dome and a tubular outlet partly within the dome and partly within the septic tank for discharge of treated sewage into the outlet pool between the tank and pool wall near the upper end of the pool wall.

4. A sewage disposal system according to claim 3, wherein the baffled inlet is shaped to direct influent nonturbulently along the inner surface of the dome and then in an arcuate path of travel in said tank toward an outlet receiving sewage from the tank and directing it into the leaching pool.

5. A sewage disposal system according to claim 4, wherein the baffled inlet is L-shaped and arranged parallel to the surface of the dome where it is attached thereto and there being a spaced between the foot of the L and the dome to permit access to the space between the leg of the L and the adjacent dome surface.

6. A sewage disposal system according to claim 3, wherein a rubber-like hinge is mounted on the tank bottom overlapping the flange on one side.

7. A sewage disposal system according to claim 3, wherein a polyethylene hinge is mounted on the tank bottom overlapping the flange on one side, said gasket being composed of neoprene cemented to the tank bottom around the opening therein.

8. A sewage disposal system according to claim 3, wherein the tubular outlet is inclined and has a pair of parallel channels separated by a rib element but connecting at their inner ends, one such channel having an entrance opening for sewage near the tank wall and the other channel having an exit to the leaching pool, sewage received in the first named channel moving upwardly and over the connecting part down the other channel and thence out through the septic tank wall, and means for securing the tubular outlet to the septic tank wall.

9. A sewage disposal system according to claim 8, wherein the connecting part of the channels is open at one side to the dome interior above normal liquid level and closed at the other side by a removable plug.

* * * * *